United States Patent [19]

Marcatili

[11] 4,123,137
[45] Oct. 31, 1978

[54] OPTICAL FIBER ARRANGEMENT FOR SPLICING FIBERS SECURED TO RIBBONLIKE TAPE

[75] Inventor: Enrique A. J. Marcatili, Rumson, N.J.

[73] Assignee: Bell Telephone Laboratories, Incorporated, Murray Hill, N.J.

[21] Appl. No.: 735,545

[22] Filed: Oct. 26, 1976

Related U.S. Application Data

[60] Division of Ser. No. 571,103, Apr. 24, 1975, abandoned, which is a continuation-in-part of Ser. No. 423,149, Dec. 10, 1973, abandoned, which is a continuation-in-part of Ser. No. 262,002, Jun. 12, 1972, Pat. No. 3,798,009.

[51] Int. Cl.² .............................................. G02B 5/14
[52] U.S. Cl. ............................. 350/96.21; 350/96.22; 350/96.23
[58] Field of Search .......................... 350/96 C, 96 B

[56] References Cited

U.S. PATENT DOCUMENTS 3,864,018   2/1975   Miller .................. 350/96 C

*Primary Examiner*—John K. Corbin
*Assistant Examiner*—John D. Lee
*Attorney, Agent, or Firm*—Charles E. Graves

[57] ABSTRACT

This application discloses an arrangement of optical fibers in a group that is particularly adapted for simple and efficient splicing. The fiber group comprises a plurality of optical fibers secured to a ribbonlike tape. In one embodiment the fibers are uniformly spaced from each other in the transverse direction, and mounted therealong in a manner to permit transverse displacement of the fiber axes when forced. A plurality of such fiber groups are disposed within a common enclosure to form a fiber cable.

7 Claims, 8 Drawing Figures

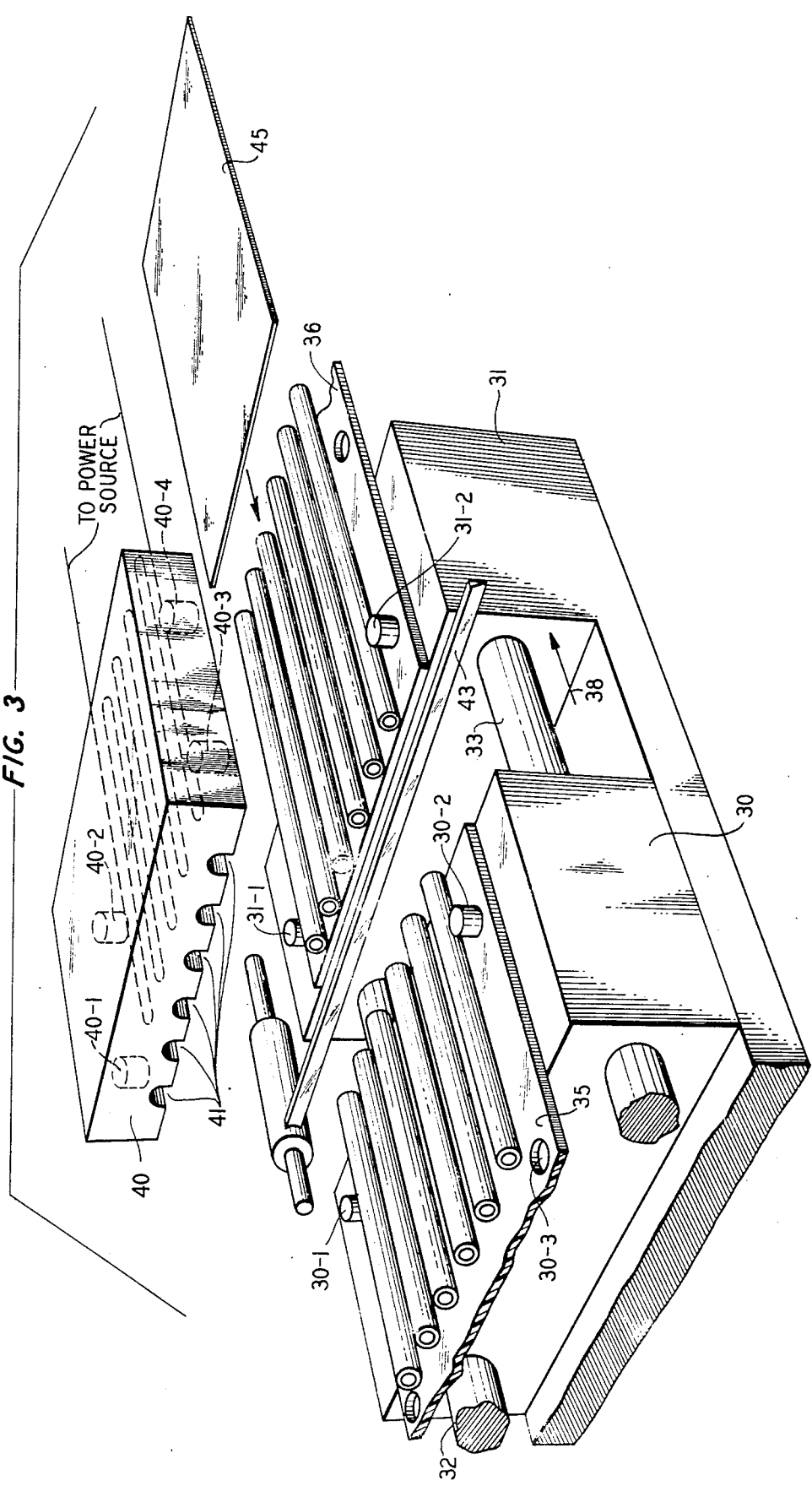

OPTICAL FIBER ARRANGEMENT FOR SPLICING FIBERS SECURED TO RIBBONLIKE TAPE

CROSS REFERENCE TO RELATED APPLICATION

This application, which relates to optical fiber splicing, is a divisional of my copending application Ser. No. 571,103, filed Apr. 24, 1975 and now abandoned, which was a continuation-in-part of my copending application, Ser. No. 423,149, filed Dec. 10, 1973, and now abandoned. The latter application was in turn a continuation-in-part of application Ser. No. 262,002, filed June 12, 1972, now U.S. Pat. No. 3,798,009.

BACKGROUND OF THE INVENTION

There is, currently, a great deal of interest in the use of solid and liquid core dielectric fibers as waveguides at optical frequencies, in much the same way as wires and metallic waveguides are used at the lower frequencies. However, if such fibers are to be used in this manner, it is evident that there will be a corresponding need for a quick, convenient and inexpensive means for splicing sections of fibers together in the course of their use.

An essential requirement of any practical splicing technique is that it resolves the alignment problem. When one considers that optical fibers have core diameters ranging from a few microns to a few mils, and that an alignment error of as little as half a diameter will result in a coupling loss of about 3 decibels, the magnitude of the problem becomes apparent.

It is, therefore, the broad object of the present invention to provide a group of optical fibers which lends itself to accurate and simple splicing procedures.

It is a further object of the invention that a plurality of such fiber groups be conveniently capable of being formed into optical fiber cables.

SUMMARY OF THE INVENTION

A fiber group, in accordance with one embodiment of the present invention, comprises a plurality of optical fibers mounted on a ribbonlike tape. The fibers are uniformly spaced from each other in the transverse direction, and mounted therealong in a manner to permit transverse displacement of the fiber axes when forced. Typically, the outside diameter of the fibers will be between 2 and 4 mils, and the permissible transverse displacement of the fiber axes advantageously will be between one-quarter and one-half the fiber diameter.

It is an advantage of the invention that in a splicing procedure employing the above-described fiber groups, the fibers are automatically aligned during the course of the splicing procedure solely by mechanical means. No special optical equipment or special alignment procedures are required.

These and other objects and advantages, the nature of the present invention, and its various features, will appear more fully upon consideration of the various illustrative embodiments now to be described in detail in connection with the accompanying drawings.

BRIEF DESCRIPTION OF THE DRAWING

FIG. 3 shows splicing apparatus for splicing fiber groups of the type illustrated in FIGS. 1A and 1B;

DETAILED DESCRIPTION

Figure 1A:
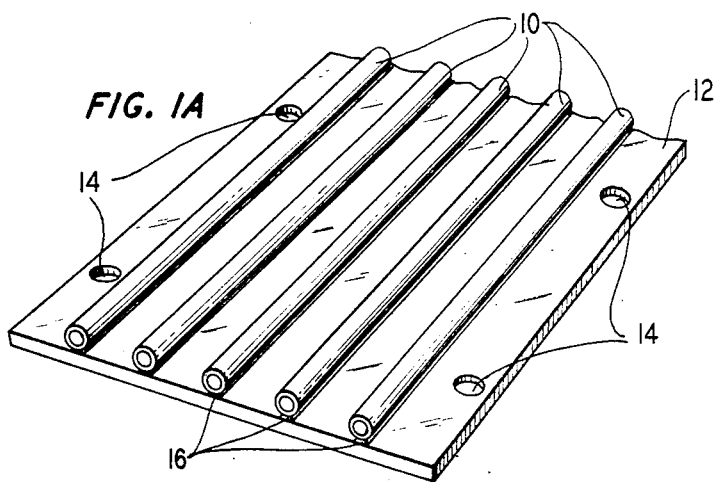
FIGS. 1A and 1B show a group of optical fibers arranged on ribbonlike tapes in a manner to permit transverse displacement of the fibers.
Figure 1B:
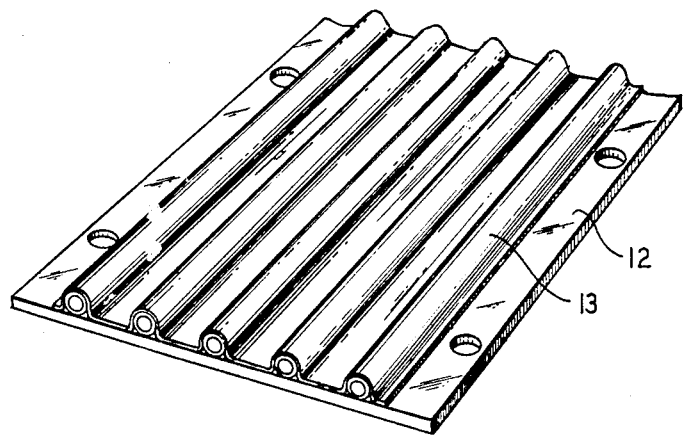

Referring to the drawings, FIGS. 1A and 1B show two variations of ribbonlike tapes. In each configuration, a group of substantially uniform optical fibers 10, each of the order of mils diameter and typically of two to four mils diameter, are mounted on a ribbonlike tape 12. For reasons which will become apparent hereinbelow, the fibers are uniformly spaced apart from each other, and mounted in a manner to permit transverse movement of the fibers a distance of between one-quarter and one-half the fiber diameter, when forced. In the arrangement illustrated in FIG. 1A, each of the fibers is cemented, or otherwise secured to tape 12 over a very limited portion of its circumference. Preferably, the joining material 16 does not extend beyond the lower half of the fiber circumference. In the arrangement illustrated in FIG. 1B, the fibers are held in place by means of a thin, conforming covering member 13 which is joined to tape 12 in the regions adjacent to each of the fibers. The fibers themselves, however, are not rigidly connected to either tape 12 or member 13. In addition, in each of these embodiments tape 12 is shown to be supplied with uniformly spaced registration holes 14 along at least one, but preferably along both sides. However, such holes can be omitted, depending upon the splicing apparatus that is used.

Figure 2A:
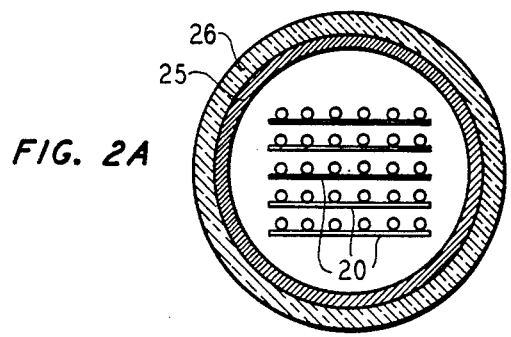
FIGS. 2A and 2B show a plurality of such fiber groups disposed within a common protective jacket to form a cable.
Figure 2B:
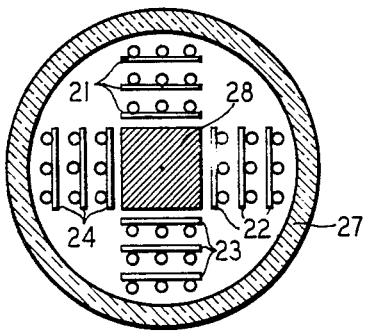

To form a cable, a plurality of such fiber groups are disposed within a common enclosure. As illustrated in FIG. 2A, a plurality of fiber groups 20 are disposed within a first, strengthening jacket 25, and a second, protective jacket 26. In a second arrangement, shown in FIG. 2B, a plurality of fiber groups 21, 22, 23, and 24 are disposed adjacent to the four sides of a centrally located strengthening core 28. The core and fibers groups are then surrounded by an outer, protective jacket 27. In both cables, the vacant space within the jacket can be filled with a suitable filler material to maintain a fixed relationship among the fiber groups.

Fibers are typically spliced either to lengthen them or to repair a break. In the former situation, and in some instances of the latter as well, the fiber sections to be spliced will have been prepared for splicing at the factory. As such, certain steps, including cutting the fiber ends evenly, will not be necessary. On the other hand, repairing breaks by splicing the existing fibers will, in general, require a number of preparatory steps. In the discussion that follows, most of the more common preparatory steps will be included in the discussion for purposes of completeness.

The above-described arrangements of fibers are spliced by means of a splicer, whose essential parts are illustrated in FIG. 3. Basically, the splicer comprises a pair of holders 30 and 31 upon which the fiber group segments to be spliced are placed. In particular, each of the holders is provided with registration posts 30-1 ... 30-4 and 31-1 ... 31-4 of a size and distribution to correspond to the registration holes 14 along the edges of the tapes. In addition, one of the holders, 30, is slideably mounted on a pair of rods 32 and 33 so that it can be moved relative to holder 31, as indicated by arrow 38.

The splicer is also equipped with an alignment cover plate 40. In the configuration shown, the latter is supplied with a number of circular recesses 40-1, 40-2 . . . 40-8 along its edges, which comport with the arrangement of registration posts on holders 30 and 31 when the holders are positioned in contact with each other. Alternatively, the cover plate can be connected to the splicer frame and lowered into position when in use. In addition, plate 40 has a plurality of longitudinally extending parallel grooves 41, equal to the number of fibers per fiber group.

To make a splice, the two fiber segments 35 and 36 are placed upon the holders 30 and 31, respectively, with the registration posts of the latter extending through the registration holes along the tapes. So mounted, the individual fibers are coaxially aligned within the tolerance limits set by the cable manufacturing process. The ends of the fibers and the tapes are then cut flush with the adjacent ends of the holders, if necessary, by means of a suitable cutter 43, or in the manner described by D. L. Bisbee in his article entitled "Optical Fiber Joining Technique" published in the December 1971 issue of the *Bell System Technical Journal,* pages 3155–3158 or by D. Gloge, P. W. Smith, D. L. Bisbee and E. L. Chinnock in the article "Optical Fiber and Preparations for Low-Loss Splices" published in *Bell System Technical Journal,* Volume 52, pages 1579–1588, Nov. 1973. A drop of bonding material is then placed on the exposed end surfaces of each of the fibers and, advantageously, on the transverse edges of the two tapes. The holders are then pushed together such that the fiber ends and the tape ends make contact.

As indicated hereinabove, the accuracy of the initial alignment of the fibers is a function of the tolerance limits inherent in the cable manufacturing process. However, it is known that the transmission efficiency of the splice will fall off markedly with even a very slight transverse misalignment of the longitudinal axes of the two fibers. Accordingly, a final, more accurate alignment is made by means of the grooved cover plate 40. As indicated above, the latter is provided with a plurality of accurately made grooves whose transverse dimension is equal to the outside diameter of the fibers. Thus, when the plate is placed in position over the splice, the fibers are automatically forced into a more accurate alignment. The plate is left in position until the bonding material sets, thus completing the splice.

A specific embodiment of the multimode fiber group, in accordance with the present invention, would comprise a one mil thick by 80 mil wide Mylar tape, upon which are mounted twenty fibers having a two-mil outside diameter, spaced one mil apart. While the exact tape dimensions and the number of fibers will typically vary, depending upon the specific application, the example given is considered characteristic of a multimode fiber group, within about an order of magnitude.

Figure 4:
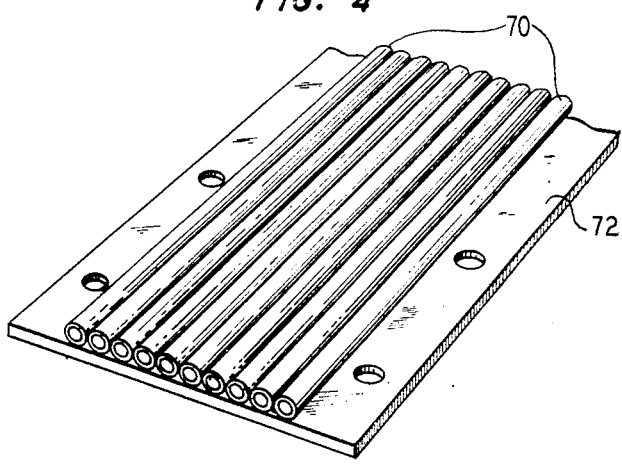
FIG. 4 shows a group of optical fibers mounted on a tape wherein the fibers are in contact along their length.
Figure 5:
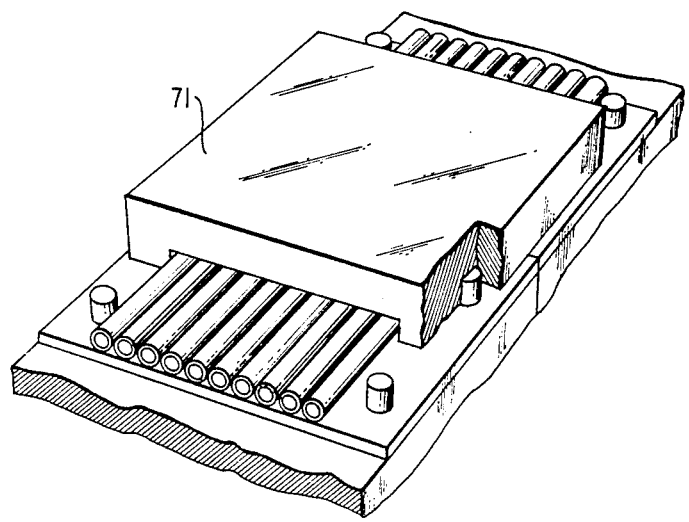
FIG. 5 shows a cover plate for aligning the fibers illustrated in FIG. 4.

As indicated above, it is most important that the spliced fibers are accurately aligned. In the arrangements described hereinabove, the fibers are handled as a group but are individually aligned by means of the grooved cover plate. This is necessary insofar as the individual fibers, though nominally identical, nevertheless will have somewhat different diameters due to variations in manufacture. With greater care in the manufacturing process, however, the diameters of all the fibers can be made to lie within specified limits which would then permit the collective alignment of the fibers. Thus, in FIG. 4, the fibers 70 are mounted on a tape 72 such that adjacent fibers are in contact with each other instead of being spaced apart, as in FIG. 1A. To complete the alignment, the cover plate 71, as shown in FIG. 5, is not grooved so as to accommodate the individual fibers, but instead includes a uniformly recessed region to accommodate the entire group of fibers. Since, as was indicated above, the fibers have been manufactured more carefully and are, therefore, more uniform, they can now be aligned as a group. In all other respects, the splicing apparatus and method described above is the same for the groups of fibers shown in FIG. 4.

Figure 6:
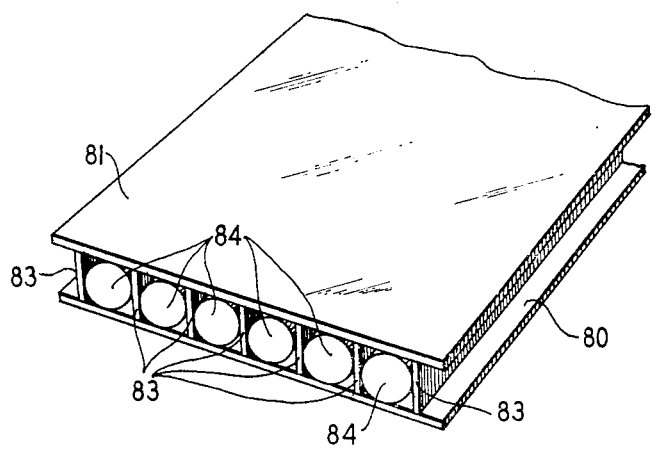
FIG. 6 shows a further ribbonlike tape structure permitting transverse displacement of fibers.

FIG. 6, now to be considered, shows a pair of transversely displaced tapes 80 and 81 that are held in a fixed, spaced relationship by means of a plurality of spacers 83 that are secured along their respective edges to the two tapes. The distance between adjacent spacers and the distance between the two tapes are equal to the outside diameter of the fibers 84 such that the fibers fit snugly within the enclosures formed by the tapes and spacers.

In applicant's U.S. Pat. No. 3,712,705 there are disclosed a variety of unclad optical waveguides. Each of the described embodiments comprises a polygonal fiber core surrounded by a circular protective jacket. Because of its shape, the core is, in effect, totally surrounded by air, and contacts the outer jacket only at a limited number of points along its outer periphery.

The ribbonlike tape of FIG. 6 described herein achieves a similar result but in an inverse manner. In this embodiment it is the core that is circular and the outer jacket that is polygonal. The result, however, is the same in that each of the fibers 84 contacts the surrounding enclosure at a limited number of points, i.e., at four points. The region between the fibers and the enclosure can be filled with any particular liquid or gas to provide a fluid cladding, or the fiber can have a solid cladding.

Inasmuch as there is no means available for making final adjustments in the relative positions of the individual fibers where sections of such a fiber group are spliced, the manufacturing tolerances are correspondingly more critical than those of the embodiment of FIGS. 1A and 1B. However, the fibers can be transversely displaced as a group, as explained in connection with the embodiment of FIG. 4.

The above-described splicing technique and apparatus are illustrative of the manner in which the fiber groups of the type described can be accurately and simply spliced together. Other splicing techniques are described in applicant's above-identified parent application.

What is claimed is:

1. An optical fiber splice connection comprising:
 a plate comprising a surface with a plurality of parallel fiber-receiving grooves, the interior surface of each said groove being formed to locate inserted fibers in planar, parallel relation;
 a first group and a second group of optical fibers with respective mating end portions inserted from opposite directions into individual ones of said grooves with the ends of mating fibers abutted;
 support means for said first and said second optical fiber groups, comprising for each group at least one ribbonlike tape continuously supporting the fibers along their full length leading into said plate and attaching the fibers to said tape to maintain the fibers in a tranverse spacing that approximately corresponds to the transverse spacing of said fiber-receiving grooves of said plate while permitting transverse displacement of each said fiber, allowing said approximate fiber-to-fiber spacing to transversely adjust to the specific spacing of said fiber-receiving grooves.

2. An optical fiber splice connection in accordance with claim 1 wherein the fiber-receiving grooves of said plate are evenly spaced and each extends the full length of said plate.

3. An optical fiber splice connection in accordance with claim 2 wherein said fiber group support means permits transverse fiber displacement from a nominal position by an amount limited to between one-quarter and one-half the diameter of one of said fibers.

4. An optical fiber splice connection in accordance with claim 1, further comprising a bonding material securing said abutted mating fibers in their respective positions established by the respective fiber-receiving grooves of said plate.

5. An optical fiber splice joint comprising:
a plate having parallel planar upper and lower surfaces;
a plurality of fiber-receiving grooves formed in at least one of said plate surfaces;
all said grooves extending the full length of said plate and having the same constant cross-section;
each groove cross-section formed symmetrically about a plane normal to the face in which said groove is formed, said planes being parallel;
interior surface means in each said groove formed to locate inserted fibers with the fiber axis contained within the normal plane associated with a said groove;
a first group and a second group of optical fibers with mating end portions inserted from opposite directions into respective said grooves, with the ends of respective pairs of mating fibers being in contact; and
support means for said first and said second optical fiber group, comprising for each group at least one ribbonlike tape continuously supporting the fibers along their full length leading into said plate and attaching the fibers to said tape to maintain the fibers in a transverse spacing that approximately corresponds to the transverse spacing of said fiber receiving grooves of said plate while permitting transverse displacement of each said fiber, allowing said approximate fiber-to-fiber spacing to transversely adjust to the specific spacing of said fiber-receiving grooves.

6. The optical fiber splice joint of claim 5 further comprising:
bonding material fixing said contacting fiber ends in their respective positions established by the respective fiber-receiving grooves of said plate.

7. An optical fiber splice connection comprising:
a plate having a surface formed with parallel fiber-receiving grooves;
first and second groups of optical fibers inserted respectively into said grooves with the ends of mating fibers in axial alignment and abutting relation; and
separate ribbons continuously supporting the fibers along their full length leading into said plate and securing respectively in spaced relation the fibers of said first group and the fibers of said second group with freedom for the fibers to displace transversely sufficient to enable the respective said fibers to align with and enter said fiber-receiving grooves.

* * * * *